United States Patent [19]

Levasseur

[11] Patent Number: 5,084,845
[45] Date of Patent: Jan. 28, 1992

[54] SELECTION CONTROL AND INDICATION MEANS

[75] Inventor: Joseph L. Levasseur, Chesterfield, Mo.

[73] Assignee: Coin Acceptors, Inc., St. Louis, Mo.

[21] Appl. No.: 626,268

[22] Filed: Dec. 12, 1990

[51] Int. Cl.⁵ .............................................. G01S 15/00
[52] U.S. Cl. ...................................................... 367/96
[58] Field of Search ..................................... 367/96, 907

[56] References Cited

U.S. PATENT DOCUMENTS 4,196,406 4/1980 Salem .................................... 367/96

Primary Examiner—Daniel T. Pihulic
Attorney, Agent, or Firm—Haverstock, Garrett and Roberts

[57] ABSTRACT

Apparatus for making a selection from between a plurality of different options such as different products vended from a vending machine including a housing structure having an elongated passageway therein, a wall at one end of the passageway, a device for introducing an acoustic pulse in the passageway at the one end and sensors means at the one end for responding to pulses introduced into the passageway and reflected back along the passageway, and a plurality of spaced selection members mounted on the housing each having a wall portion movable between positions extending into the passageway thereat and position not extending into the passageway. The invention may also be used in association with a microprocessor capable of determining the round trip travel time of a pulse introduced into the passageway including the round trip travel time when the pulse is reflected by a fixed opposite end of the passageway for calibration purposes.

17 Claims, 2 Drawing Sheets

SELECTION CONTROL AND INDICATION MEANS

BACKGROUND OF THE INVENTION

The present invention relates to devices for making a selection by a customer of a vending machine from among a number of products or services, and for controlling the operation of the vending or like machine accordingly. If desired, the device can also include means to indicate the selection made. The present invention, because of its simplicity and trouble free construction, represents an improvement over previous vend selection means.

Many devices are in existence by which a customer of a vending machine is able to make a selection from among a plurality of products or services offered by the machine and for controlling the vending machine to cause the product or service that has been selected to be vended. Various mechanical devices, switch devices including devices such as electrical, optical, Hall effect, resistive, conductive and capacitive switch devices have been used in the past for selection devices including to indicate a selection made and to produce a signal or other response to cause the selection to be effected. The various known selection devices each have some advantages as well as disadvantages over other selection devices in terms of the number of components involved, the number of moving parts, the circuitry including replicative circuitry involved, their durability, the number of connections required, their cost, the cost of installation, their reliability and flexibility. The disadvantages of the known devices include slowness of operation, frequency of maintenance required, space required, and complexity to name a few.

The present invention is directed to selection means operable by a customer wherein the device makes use of an enclosed air passageway which can be blocked or partially blocked at different locations along the length thereof by the customer actuating a selected passage blocking device, which device changes the effective length of the air passageway and hence the time required for an air pressure pulse originating at one end of the passageway to be reflected back to the same end of the passageway where its arrival is sensed. The time required for a pulse of air pressure to move along the passageway and be reflected back to the same end is a time that can be accurately determined and can be used by means that determine the round trip distance the pulse traveled, the distance being representative of the time required and of the selection made. The present invention therefore utilizes the fact that sounds travels through air at a certain known rate at a given elevation. For example at sea level, sound travels at the rate of 1088 feet per second or at the equivalent 13,056 inches per second. Although some calibration for different temperatures and pressures (elevations) may be required, these will generally not be substantial enough to require significant adjustment to accommodate most elevations. The air pressure pulses produced by the present device may be produced by a pulse driver such as by an audio driver or speaker, and the means for sensing the return of the reflected pulses may be a sensor device such as a microphone or the like.

The subject device can also have its selection capabilities calibrated and recalibrated as often as desired from reflections made off of the fixed far end of the channel from the speaker. This is done to compensate for changes in the atmospheric conditions including pressure. This can be done knowing the distance between the ends of the enclosed channel so that when the speaker sends an acoustic pulse down the channel for reflection back from the fixed far end wall the round trip time interval can be measured and used to calibrate the device. This will also enable more accurate measurement from each of the selection means and will enable a denser (closer together) arrangement of the selection means taking into account changes that may occur in the atmospheric conditions that exist in the channel.

The present device represents a relatively simple, easy to operate, durable and trouble-free means for making a product selection and for effectively vending same. The device can also include means to indicate the selection made. The present means are relatively inexpensive to make, easily adaptable to various vending control configurations, and can even be made to be flexible, if desired. The present device also lends itself to being used to make a relatively large number of selections as required and without requiring any added or replicative circuitry such as replicative circuitry for each different possible vend as required of some known devices. The present selection means can be made to accommodate a substantial number of possible selections with relatively little equipment and represents a significant improvement in the construction and operation of product or service selection means for vending and like machines, and means which enable an increase in the number of possible selections without adding any circuitry to the vending machine as a result of increasing the number of possible selections available.

OBJECTS OF THE INVENTION

It is a principal object of the present invention to teach the construction and operation of novel selection means for a vending device.

Another object is to teach the construction and operation of novel means for selecting from among a number of possible vends and for indicating each selection made by a customer.

Another object is to detect selections made in a vending machine by introducing an acoustical pulse into an enclosed passageway and determining the round trip time required for the pulse to move along the passageway and to be reflected back to a point near where the pulse was introduced.

Another object is to enable calibration and recalibration of a vend selection device that introduces acoustic pulses into an enclosed passageway by using the fixed far end of the passageway to establish the calibration taking into account existing atmospheric pressure conditions.

Another object is to provide selection means for a vending machine that do not require any switches or like means and that minimizes the connections required to make a relatively large number of selections.

Another object is to simplify the construction and operation of the selection means used in vending devices.

Another object is to increase the number of possible selections that can be made in a vending machine without requiring any replicative circuitry for each possible selection.

Another object is to teach the construction of product selection means for a vending machine which are relatively durable, trouble-free and difficult to defeat.

Another object is to increase the versatility of vending machined without increasing the complexity of the circuitry required for their operation.

Another object is to control product selectivity in a vending machine by means which can be made rugged as well as flexible These and other objects and advantages of the present invention will become apparent after considering the following detailed specification of a preferred embodiment of the subject device in conjunction with the accompany drawings wherein;

DETAILED DESCRIPTION OF A PREFERRED EMBODIMENT

Figure 1:
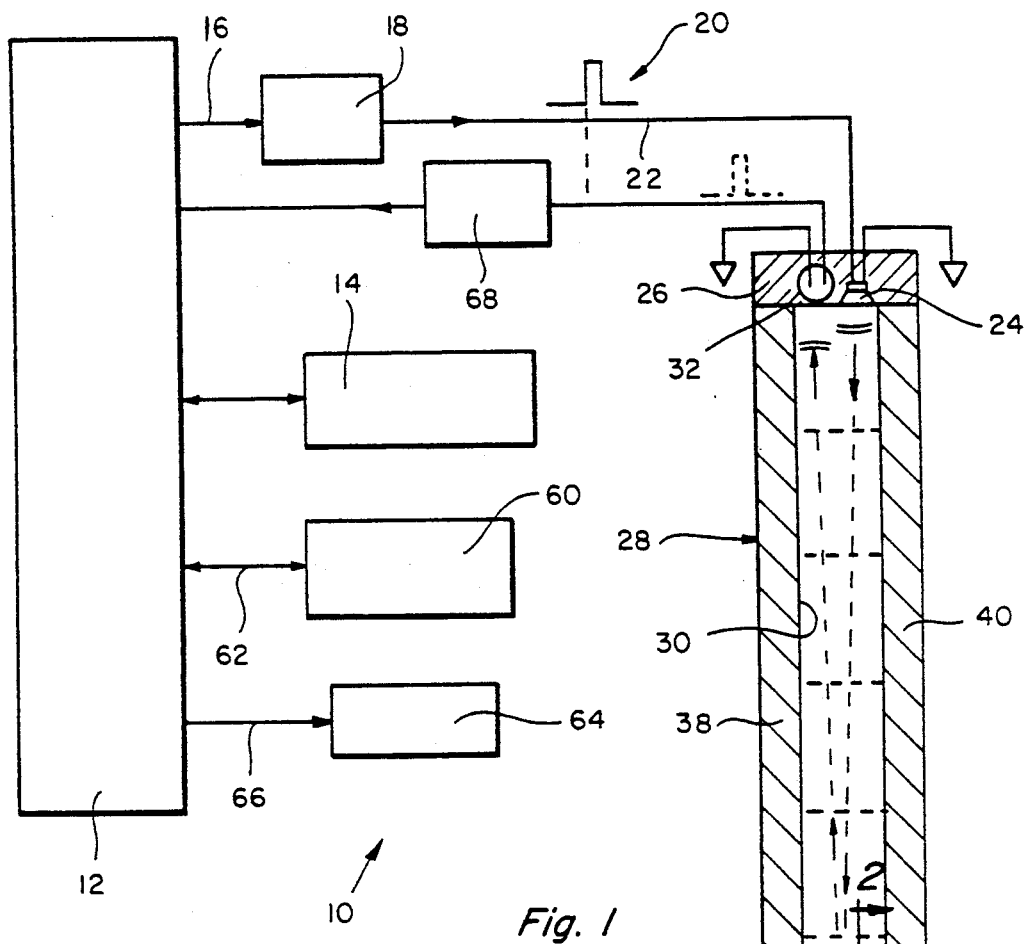
FIG. 1 is a schematic circuit diagram in block form of a control circuit for a vending machine having product selection means constructed according to the present invention, the product selection means being shown in cross section.

Referring to the drawings more particularly by reference numbers, number 10 in FIG. 1 refers to a microprocessor control system for a vending machine. The system 10 includes a microprocessor 12 which has a plurality of inputs and outputs for connection to devices such as to cash/credit transaction means 14 which determines the value of cash or coinage deposited in the vending machine and establishes a credit for the customer. The microprocessor 12 also has an output lead 16 which is connected to a pulse driver 18 which produces output pulses such as pulse 20 which appears on lead 22. The output pulses 20 are applied to a transducer or loud speaker 24 which is mounted in end wall 26 of elongated housing 28 which encloses an elongated passageway 30. The housing end wall 26 also supports a microphone or other noise sensor 32.

The housing 28 has a closure wall 34 (FIG. 2), a bottom wall 36 and spaced side walls 38 and 40. The closure wall 34 has a plurality of spaced openings 42 each of which has an enlarged outer portion 44 and a narrow elongated slotted inner portion 46. An operator or key 48 is positioned in each of the openings 42, and each key includes an enlarged key head portion 50 for operation by a customer and connected portions 52 and 54. The portions 54 are shown as flat walls which, when the key 48 is depressed, moves to a position extending across and substantially blocking the passageway 30 at the location thereof. A plurality of the keys 48 are mounted at spaced locations along the wall 34, and each of the keys is biased into an outwardly extended position by a respective spring such as by spring 56 which moves flanges 57 on the keys 48 against wall member 58, which wall is shown supported on the wall 34 by an L-shaped bracket 59.

The microphone 32 is shown positioned adjacent the transducers or speaker 24 in the end wall 26 and responds to the air pressure pulses introduced into the passage 30 by the transducer 24 after the pulses have moved along the passageway 30 and have been reflected by the wall portion 54 of the activated selection key 48.

Other means in the vending control circuit are also connected to and controlled by the microprocessor 12. These include a product delivery means 60 which is connected to the microprocessor 12 by lead 62 and an optional display device 64 which is connected to the microprocessor 12 by lead 66. A microphone amplifier circuit 68 is also provided and has one side connected to the microphone 32 and its opposite side connected to the microprocessor 12. The other side of the microphone 32 is grounded.

The passageway or channel 30 can have several different constructions and dimensions all of which include an enclosed housing structure such as housing 28 with the elongated passageway 30 extending substantially the length thereof. The Passageway 30 can be installed to be in a vertical or horizontal orientation such as on the front wall of a vending machine, the important thing being to make the selections means convenient to the customer.

Since the subject selection means have no switches or other electrical, magnetic or optical means associated with them, they can be made to be relatively simple, rugged and trouble free. This is a significant advantages because not only does it substantially simplify the construction of the selection means, but it also provides a relatively large number of selection possibilities in a device that is of simple construction and one which makes the device relatively difficult to defeat as well as to damage.

Figure 2:
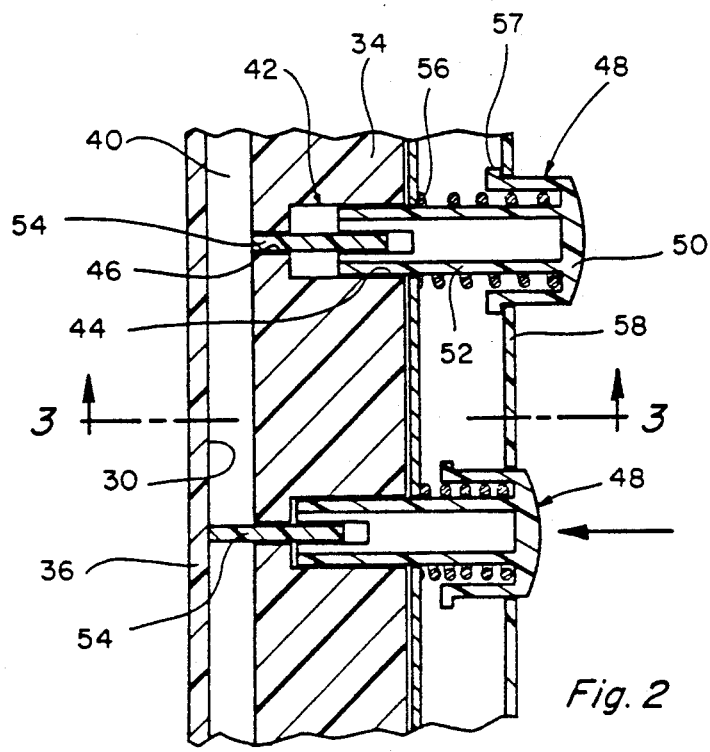
FIG. 2 is a fragmentary cross-sectional view taken on line 2—2 of FIG. 1.
Figure 3:
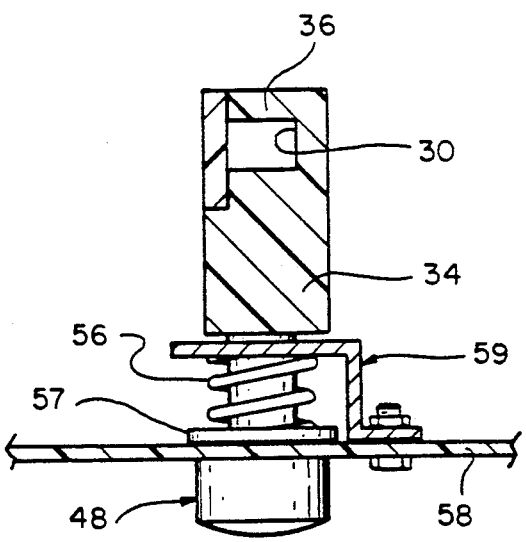
FIG. 3 is a fragmentary cross-sectional view taken on line 3—3 of FIG. 2.

When one of the keys is depressed as shown by the member 48 in FIG. 2, the wall portion 54 of that member will be moved to a position extending into and closing or substantially closing the passageway 30 thereby substantially blocking the passageway and forming a surface against which the pulse or pulses generated by the transducer 24 will impinge. The particular operator member or key 48 that is depressed will therefore establish the effective round trip distance that pulses will travel between the transducer 24 and the microphone 32. Since noise signals involve air pressure differences, and since such signals travel at known rates of speed taking into account elevation as indicated above, it is possible to accurately determine from how long it takes for the air pressure pulse to make the round trip, the selection that has been made. This information can then be used to control means to produce the desired vend and, if desired, to indicate the selection on a display device.

The round trip time can accurately be determined in the microprocessor 12 since the microprocessor generates each pulse 20 that is transmitted by the transducer 24, and the microprocessor also responds to receipt of the return pulse by the microphone 32 after amplification by the amplifier 68. The microprocessor can compare the round trip time to data stored in the microprocessor such as in a look up table that has values to represent the different possible selections. Once the selection has been determined, the microprocessor 12 can control the product or service delivery means, and if it is determined that the amount deposited by the customer equals or exceeds the cost of the selected product or service an appropriate vend, and if necessary refund of an over deposit, can be made. The microprocessor 12 can also be used to energize the display device 64 to produce a visual indication as to the product or service selected. In this way the customer can verify the selection made with what is vended. The means to produce the vend and refund operations as well as to produce the display can all be of conventional construction and are not part of the present invention.

The passageway 30 has an end wall 69 which is at the opposite end thereof from the end wall 26. The end wall 69 is used to calibrate the device when a pulse is introduced and reflected back by the opposite end taking into account the atmospheric conditions which exist and which may vary from time to time. Since the distance between the end walls 26 and 69 is fixed, and known, the round trip time for an acoustical pulse introduced into the passageway 30 may vary somewhat due to changes in the atmospheric conditions including the atmospheric pressure. By periodically pulsing the device, the device and the selection means can be calibrated using reflections off of the end wall 69. In this way it can also be made to be very accurate at the positions of each of the selection devices, and this is true regardless of the spacing of the selection devices or the number of selection devices located along the passageway. The calibration can be done on a periodic basic and can be handled by the same microprocessor, and in a way similar to the way the microprocessor handles other pulses. The difference being that in the case of calibration the pulses travel the full length of the passageway and are reflected by the fixed end wall 69 rather than being reflected by an actuated selection device.

Figure 4:
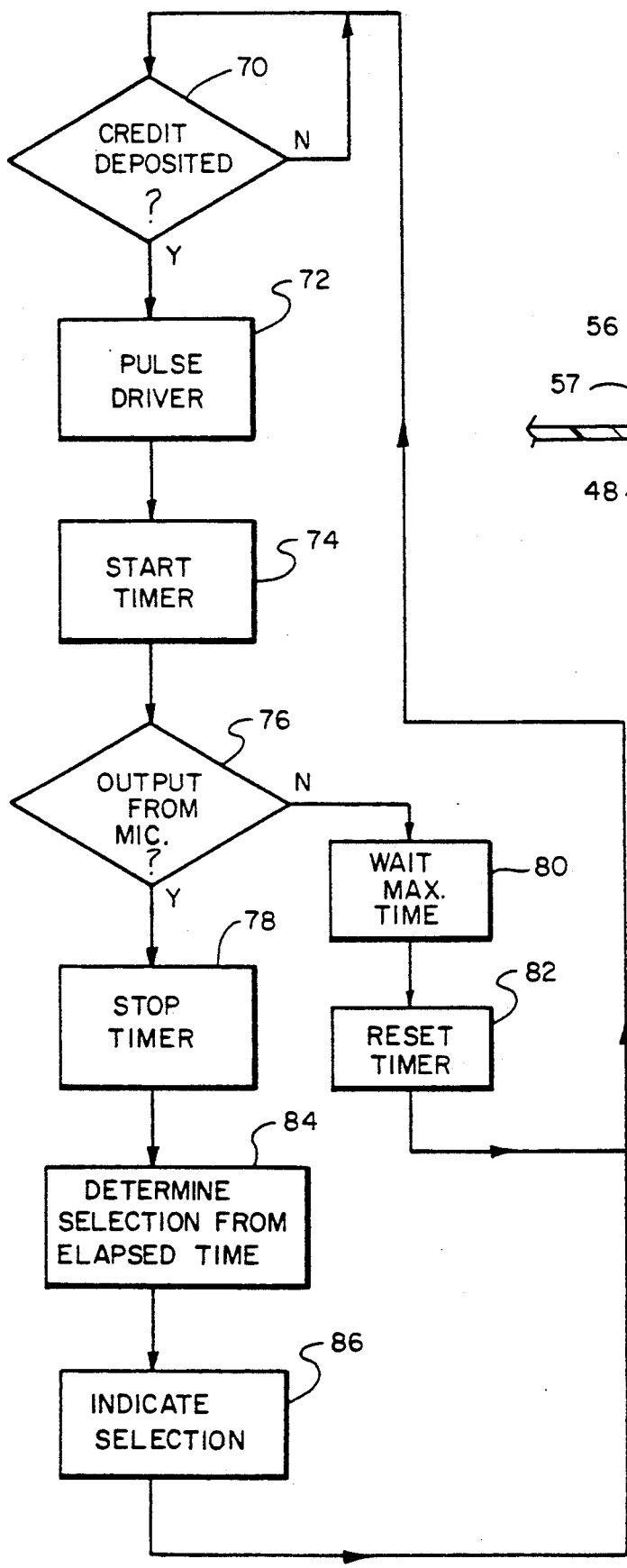
FIG. 4 is a flow chart diagram to illustrate the operation of the selection means shown in FIG. 1.

FIG. 4 is a flow chart showing the operation and operating sequence for the various elements that take place using the circuit means of the present device. Once a deposit has been made and recognized by the block 70 labeled Credit Deposited, the block will produce an output. The Y output of the block 70 will be activated and its output applied as an input to block 72 labeled Pulse Driver. The output of block 72 is in turn applied as an input to block 74 labeled Start Timer and the output of the Start Timer is applied to block 76 labeled Output From Mic. This block has a Y output connected to the input of block 78 labeled Stop Timer which operates to stop the timer when an output from the microphone 32 is received. If the block 76 does not receive an output from the microphone 32, its N output will be activated and will apply a signal to block 80 labeled Wait Max Time after which a signal will be applied to block 82 labeled Reset Timer which will cause the circuit to go back to the input to block 70 to try again.

If the Stop Timer block 78 receives an output from the Y output of the block 76, it will apply a signal to the input of block 84 labeled Determine Selection From Elapsed Time. This block will produce an output which is applied to block 86 labeled Indicate Selection that will indicate the selection made. The same signal will be fed back to the input of the Credit Deposited block 70. The block diagram shows the sequences that takes place with respect to the selection means but does not show the connections which cause the other vending machine operations to take place. The sequence is also applicable to calibrate the device as required.

It should now be apparent that a large number of selections can be made using a device that has no switches and miminal circuitry. It should also be recognized that the passageway can take different forms and shapes and it is even possible to use a flexible member with a passageway therethrough which can be operated by pinching or clamping the device at various locations therealong.

Thus there has been shown and described novel selection means for use on vending and like machines which fulfill all of the objects and advantages sought therefor. It will be apparent to those skilled in the art, however, that many changes, variations, modifications and other uses and applications for the present invention are possible. All such changes, variations, modifications and other uses and applications which do not depart from the spirit and scope of the invention are deemed to be covered by the invention which is limited only by the claims which follow.

What is claimed is:

1. Means for selecting between a plurality of items in a vending machine comprising a housing having an elongated channel formed therein and a wall member closing the channel along one side, a plurality of customer actuatable selection devices mounted on the wall member at spaced locations along the channel, each selection device including a member having a first relatively flat portion and a second portion connected thereto and extending therefrom, an opening in the wall member for each respective one of said selection devices including an associated slot for receiving the relatively flat first portion thereof and an opening adjacent to each associated slot for receiving the second portion of the respective actuatable selection device, means biasing each of the selection devices into a position wherein the first portion of each of the selection devices is positioned extending into the associated slot in the wall member, actuation of a selection device moving the first portion thereto into position extending into the channel, said channel having a first end, means at said first end capable of introducing an acoustical pulse into the channel for movement therealong, said pulse being reflected back along the channel by impacting on the first portion of an actuated one of the selection devices, and means at said first end of the channel for responding to receipt of a pulse reflected by the first portion of the actuated selection device.

2. Selection means including a housing having an elongated channel formed therein including a wall portion extending along and closing the channel, a plurality of selectable devices located in the housing at spaced locations along the channel, each selectable device including a member having a wall portion movable between a position blocking the channel and a nonchannel-blocking position, means adjacent one end of the channel for introducing an acoustic pulse into the channel for movement therealong, other means adjacent said one end of the channel for responding to pulses introduced into the channel for movement along the channel and reflected back to said one end, and means responsive to when an acoustic pulse is introduced into the channel and when the reflected pulse is sensed by the pulse responsive means.

3. The selection means of claim 2 wherein the means responsive to where an acoustic pulse is introduced into the channel and when the reflected pulse is sensed includes a microprocessor having an input connected to the means for introducing an acoustic pulse into the channel, said microprocessor having a second input connected to the means for responding to the reflected pulse, and means in the microprocessor for determining the time interval between when the acoustic pulse is introduced and when the reflective pulse is sensed by the responsive means.

4. The selection means of claim 3 including a vend producing means corresponding to each selectable device, and means under control of the microprocessor for actuating one of the vend producing means depending in which selectable devices is actuated.

5. The selection means of claim 2 including means mounting the selection means on a vending machine which has means for receiving deposits of credit and for establishing a credit condition therefor, means for producing a selected vend operation depending upon which of the selectable devices is actuated, and means to refund credit amounts deposited in excess of the selected vend.

6. The selection means of claim 2 including display means for displaying which of the selectable devices is actuated.

7. The selection means of claim 2 wherein the selectable devices are spring biased into non channel blocking positions.

8. The selection means of claim 2 wherein the means adjacent one end of the channel for introducing an acoustic pulse into the channel include loud speaker means.

9. The selection means of clam 2 wherein the means responsive to when the reflected pulse is sensed includes microphone means.

10. The selection means in claim 2 wherein the means adjacent one end of the channel for introducing an acoustic pulse into the channel and for responding to pulses introduced and reflected back to said one end include a pulse transducer.

11. The selection means of claim 2 wherein the means responsive to when an acoustic pulse is introduced into the channel and when the reflected pulse is sensed include pulse amplifying means.

12. The selection means of claim 2 wherein the channel has spaced opposed first and second end walls, the first end wall being located at said one end of the channel, the means responsive to when the acoustic pulse is introduced and when the reflected pulse is sensed including means for calibrating the device by establishing positions of the selectable devices along the channel taking into account atmospheric conditions.

13. Means for making a selection from between a plurality of different options comprising an elongated housing structure having an elongated passageway therein, said passageway having a side wall extending along one side thereof and an end wall, first means on the end wall for introducing an acoustic pulse into the passageway for movement therealong, second means on said end wall responsive to acoustic pulses introduced into the passageway and reflected back thereto, and a plurality of spaced actuator members mounted in the housing side wall at spaced locations along the passageway, each of said actuator members having an actuator portion and a wall portion connected thereto, means biasing each of the actuator members into position where the wall portion thereof is positioned outwardly of the passageway, each of said actuators being movable in opposition to the biasing means to a position where the wall portion thereto moves to a position extending into the passageway.

14. Selection means including a housing having an elongated channel formed therein including a wall portion extending along and closing the channel, a plurality of selectable devices located in the housing at spaced locations along the channel, each selection device including a member having a portion movable between a position extending into the channel and a position not extending into the channel, means adjacent one end of the channel for introducing an acoustic pulse into the channel for movement therealong, other means adjacent said one end of the channel for responding to pulses introduced into the channel for movement along the channel and reflected back to said one end, and circuit means connected to the means for introducing an acoustic pulse and to the means for responding to pulses introduced into the channel and reflected back, said circuit means including means for determining the time between when the acoustic pulse is introduced and the reflected pulse is sensed by the other means, the determined time depending upon which of the selectable devices has its portion in position extending into the channel.

15. The selection means of claim 14 wherein the circuit means includes a microprocessor having means connected to the other means.

16. The selection means of claim 14 wherein the selectable devices are spring biased into positions outwardly of the channel.

17. The selection means of claim 14 wherein the channel has spaced opposed first and second end walls, the first end wall being located adjacent said one end, the circuit means including means to establish from the time when an acoustic pulse is introduced and when the reflected signal is sensed a round trip time for a signal to move between the first and second end walls taking into account atmospheric conditions.

* * * * *

UNITED STATES PATENT AND TRADEMARK OFFICE
CERTIFICATE OF CORRECTION

PATENT NO. : 5,084,845
DATED : January 28, 1992
INVENTOR(S) : Joseph L. Levasseur It is certified that error appears in the above—identified patent and that said Letters Patent is hereby corrected as shown below:

Column 3, line 5, "machined" should be --"machines"--.

Column 4, line 18, "Passageway" should be --"passageway"--.

Column 6, line 33, "thereto" should be --"thereof"--.

Column 7, line 24, "clam" should be --"claim"--.

Column 8, line 11, "thereto" should be --"thereof"--.

Signed and Sealed this

Thirtieth Day of March, 1993

Attest:

STEPHEN G. KUNIN

Attesting Officer

Acting Commissioner of Patents and Trademarks